May 8, 1928.
B. C. VON PLATEN ET AL
1,669,269
REFRIGERATION
Original Filed Aug. 4, 1923
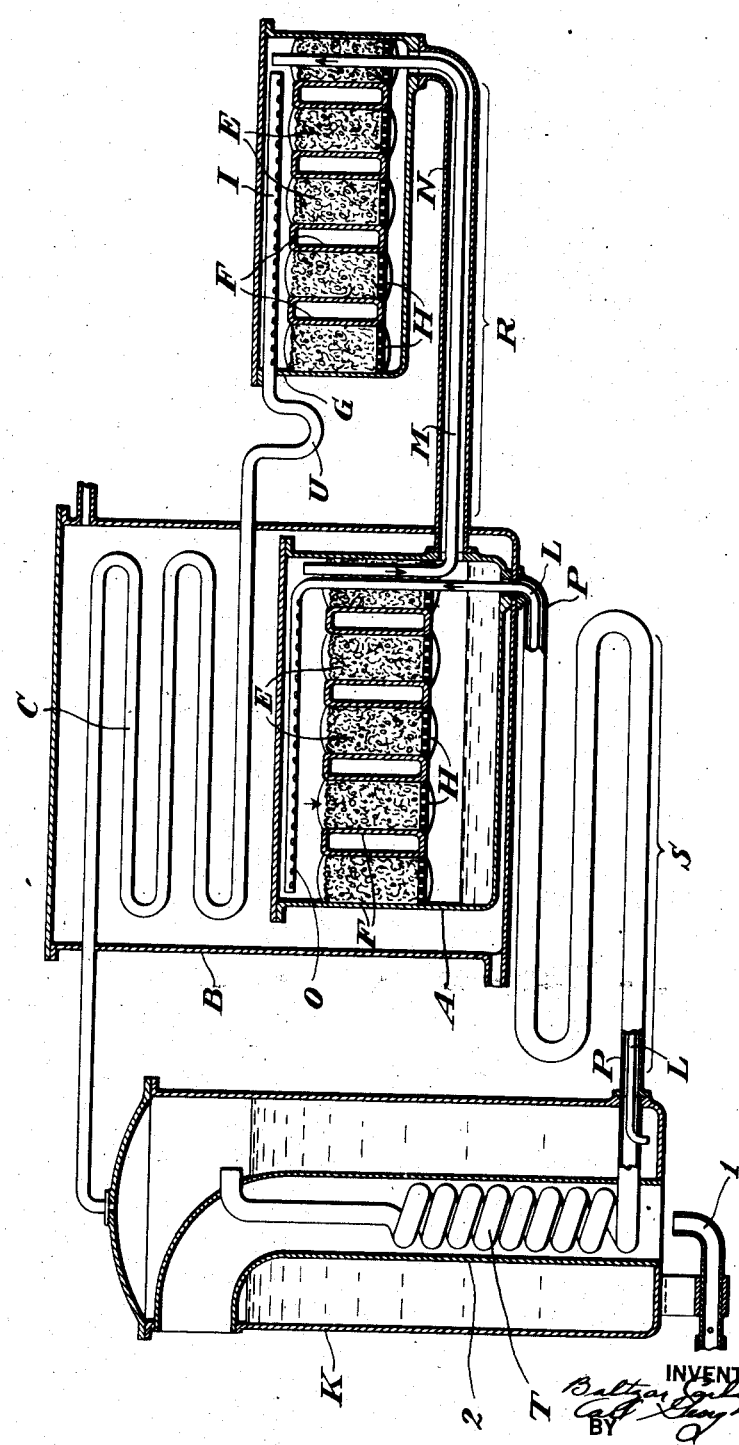
INVENTOR
BY
ATTORNEY Patented May 8, 1928.

1,669,269

UNITED STATES PATENT OFFICE.

BALTZAR CARL von PLATEN AND CARL GEORG MUNTERS, OF STOCKHOLM, SWEDEN, ASSIGNORS TO ELECTROLUX SERVEL CORPORATION, OF NEW YORK, N. Y., A CORPORATION OF DELAWARE.

REFRIGERATION.

Original application filed August 4, 1923, Serial No. 655,768, and in Sweden August 18, 1922. Divided and this application filed March 4, 1927. Serial No. 172,673.

This application is a division of our copending application Serial No. 655,768, filed August 4, 1923, Patent No. 1,620,843.

The invention relates to absorption refrigerating apparatus in which the absorption liquid is circulated through the generator and the absorber and more particularly to absorption refrigerating apparatus of the kind in which the generator and absorber are arranged in open communication with one another. The object of the invention is to effect an automatic circulation of the absorption liquid without using any kind of mechanical device.

The invention is characterized principally in that the circulation of absorption liquid is effected by means of a thermo-siphon included in the circulating system for forming a part of the conduit whereby the absorption liquid is conveyed from the absorber to the generator, the upward leg of the thermo-siphon being formed principally of a coil or other member placed within a flue within the generator.

The invention will be more fully described with reference to the accompanying diagrammatic drawing illustrating one embodiment of the invention.

The refrigerating apparatus shown on the accompanying drawing comprises a generator K, an evaporator G and an absorber A. The generator K contains the cooling agent, for instance ammonia, dissolved in water. The evaporator G and the absorber A contain a gas or gas mixture, which is inert with respect to the cooling agent and which may be hydrogen. The evaporator and the absorber preferably contain a porous or fibrous material E, for instance metal wool or cuttings, disposed in a number of tubular cells F, which communicate with one another at the top and at the bottom, and which are provided with perforated bottoms H. Said porous or fibrous material serves as a means for distributing the liquid entering the evaporator and the absorber respectively over a large surface while at the same time facilitating the transfer of heat. The gas space of the generator is connected with the upper part of the evaporator G by means of a condenser coil C, placed together with the absorber in a cooling water tank B. The end of the pipe entering the evaporator forms a perforated distributor I. The evaporator G and the absorber A are arranged in unobstructed communication with one another by means of pipes M and N connecting the receptacles at the top and at the bottom respectively and forming together a heat exchanger R, the pipe M being located inside the pipe N. The evaporator should generally be located at a higher level than the absorber in order to prevent the lower pipe connection between the evaporator and the absorber from being closed up by liquid.

The generator and the absorber are connected with one another by means of pipes L and P so as to form a closed circulating system for the absorption liquid, the generator and the absorber being thus permanently in open communication with one another. The pipe L opens at one end into the generator at the bottom thereof and at the other end into the upper part of the absorber, the latter end of the pipe forming a perforated distributor O. The pipe L is located inside the pipe P so as to form a heat exchanger S. The end of the pipe P entering into the generator is formed into a coil T which is situated within a flue 2 passing through the generator and into which is directed a gas burner 1 supplying heat both to the coil T and to the generator. Coil T opens either into the liquid or into the gas space immediately above the surface of the liquid in the generator and operates as a thermo-siphon to circulate the absorption liquid.

The apparatus operates as follows:

On heating the generator the ammonia is expelled from the water and caused to flow from the generator through the condenser coil C and a liquid seal U to the evaporator G. The ammonia is condensed in the condenser so as to reach the evaporator in liquid condition. The ammonia, consequently, flows into and spreads over the porous or fibrous material E, at the same time evaporating and diffusing into the hydrogen in the evaporator while absorbing heat from the surroundings of the evaporator. The mixture of hydrogen and ammonia which is heavier than the hydrogen itself, will flow through the pipe N into the cooled absorber A and, in rising through the fibrous material E in the cells F, it will be brought in contact with the liquid flowing down through the absorber, the ammonia but not the hydrogen being then dissolved or absorbed in the liquid. The ammonia is thus separated from the gas mixture, whereas the hydrogen rises through the absorber and returns to the evaporator G through the pipe M. On entering the evaporator, the hydrogen again mixes with the ammonia vapor. The automatic circulation of the inert gas is thus maintained substantially on account of the difference of the specific weights of the inert gas and the vapor of the cooling agent but also owing to the cooling of the gases in the evaporator and the heat of the gases in the absorber, the specific weight of the gases being thereby increased and decreased respectively.

All parts of the apparatus being in open and unobstructed communication with one another, the same or substantially the same absolute pressure will prevail throughout the whole apparatus.

The circulation of the absorption liquid is effected in such a manner that the concentrated solution collecting at the bottom of the absorber is returned to the generator through the pipe P, whereas the liquid which is poor in ammonia is conveyed to the absorber through the pipe L. The circulation is maintained exclusively by the thermo-connection between the circulating system and the generator, the liquid being preheated in the heat exchanger S and further heated in the coil T, which then operates as a thermo-siphon through which the liquid is lifted by the gas developed therein to a level that is high enough to allow the liquid to flow directly into the absorber.

While we have described one form of our invention, it is to be understood that we are not to be limited thereto.

Having thus described our invention, what we claim is:

1. Refrigerating apparatus comprising a generator, a condenser, an evaporator, an absorber, a flue extending within said generator, a coil within said flue, means to connect the upper part of the coil with the upper part of the generator, means to connect the lower part of the coil with the absorber, a conduit connecting said generator with said absorber independently of the coil and a burner directed into said flue.

2. Refrigerating apparatus comprising a generator, a condenser, an evaporator, an absorber, a flue extending within said generator, an upwardly extending member within said flue adapted to hold fluid, means to connect the upper part of said member with the upper part of the generator, means to connect the lower part of the member with the absorber, a conduit connecting said generator with said absorber independently of said member and a burner directed into said flue.

3. Refrigerating apparatus comprising a generator, a condenser, an absorber, an evaporator, means to interconnect the generator, condenser, evaporator and absorber to maintain the same total pressure therein, said means including communications between the absorber and evaporator arranged to form a circuit, said circuit being arranged to contain vertically extending bodies of fluid of such nature that circulation is caused to take place within said circuit due to difference in specific weights of different vertically extending bodies, a flue extending within said generator, a coil within said flue, means to connect the upper part of the coil with the upper part of the generator, means to connect the lower part of the coil with the absorber, a conduit connecting the generator with the absorber independently of the coil and a burner directed into said flue.

4. Refrigerating apparatus comprising a generator, a condenser, an evaporator, an absorber, a conduit for conducting vapor of a cooling agent from the generator to the condenser, a conduit for conveying liquid cooling agent from the condenser to the evaporator, a plurality of conduits connecting the evaporator and absorber for circulation of an auxiliary agent in the presence of which the cooling agent evaporates, a flue extending within the generator adapted for passage of gas through the same, a coil within said flue, means to connect the upper part of the coil with the upper part of the generator, means to connect the lower part of the coil with the lower part of the absorber, a conduit connecting said generator with said absorber independently of said coil and a burner for gas directed into said flue, the arrangement being such that absorption liquid may flow downwardly from the absorber to the coil and heat applied to the coil may vaporize some of the liquid in the coil whereby decrease in specific weight of fluid in the coil is adapted to result in continuous circulation of absorption liquid from the absorber through the coil and into the generator and from the generator to the absorber.

In testimony whereof we hereunto affix our signatures.

BALTZAR CARL von PLATEN.
CARL GEORG MUNTERS.